(No Model.)  12 Sheets—Sheet 1.
L. LEGRAND.
EMBROIDERING MACHINE.
No. 466,248.  Patented Dec. 29, 1891.
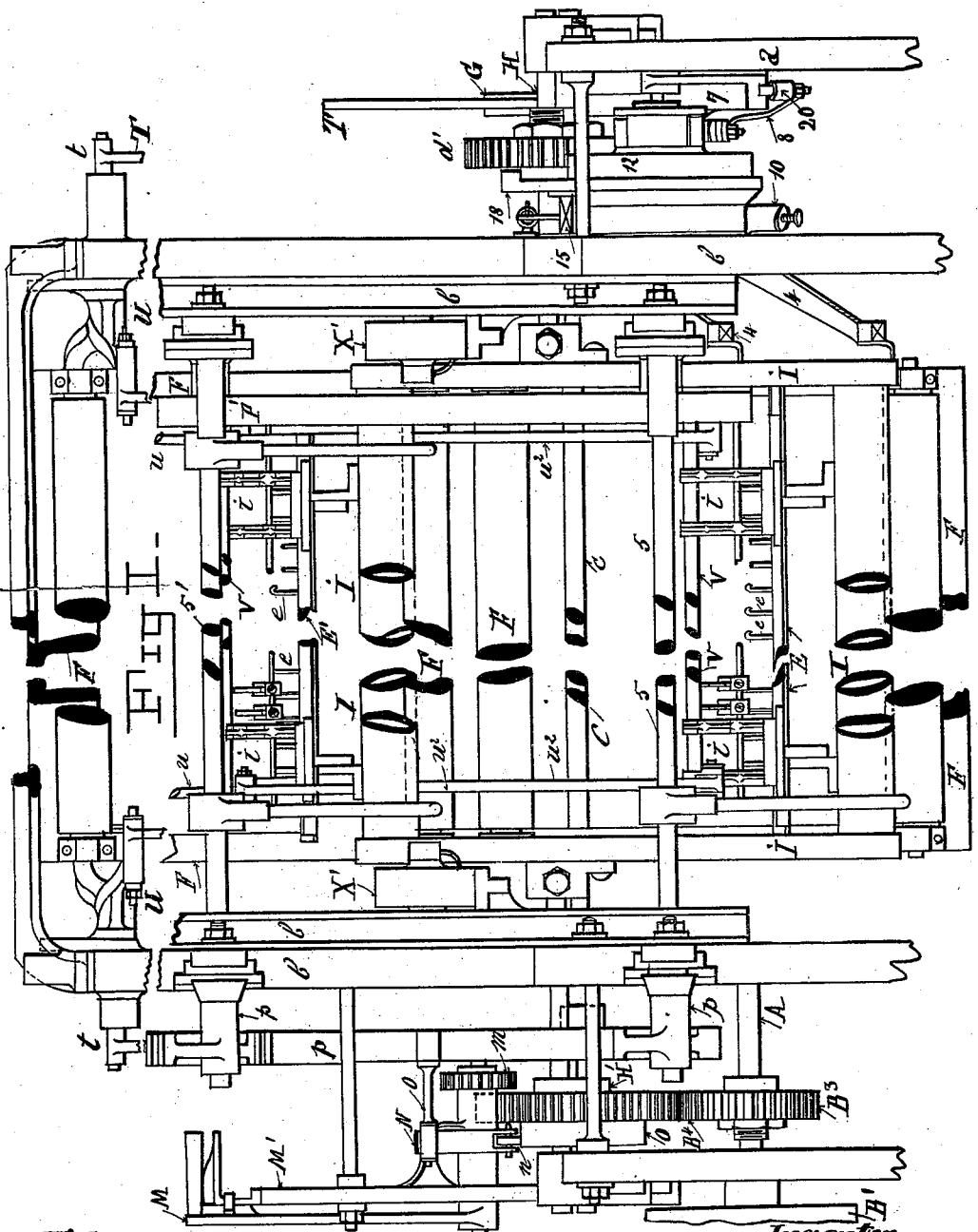
Witnesses:
Henry J. Dieterich
B. W. Sommers
Inventor
Louis Legrand,
per
Henry ...
Attorney (No Model.) 12 Sheets—Sheet 2.
L. LEGRAND.
EMBROIDERING MACHINE.
No. 466,248. Patented Dec. 29, 1891.
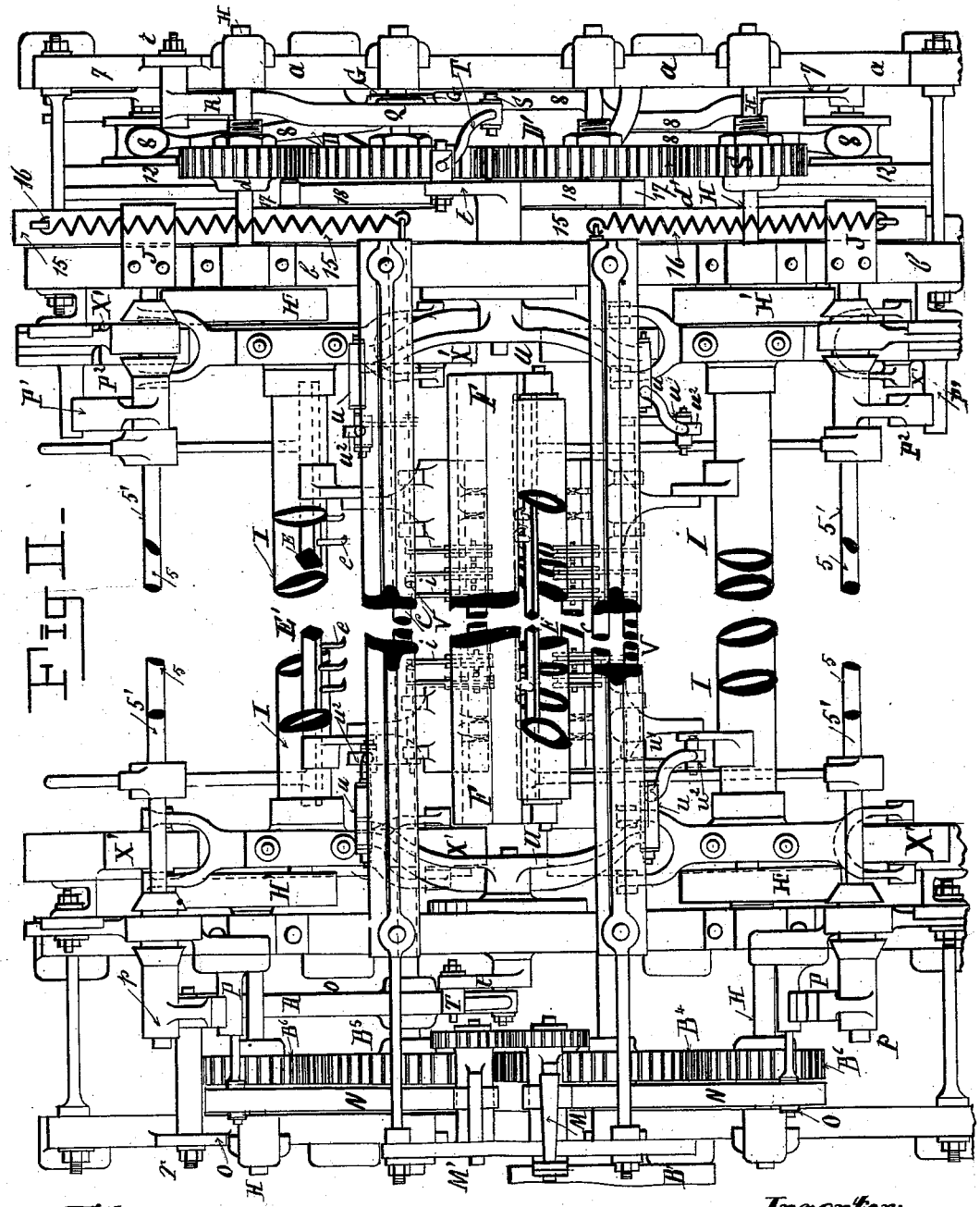
Witnesses
Henry G. Dieterich
P. W. Sommers
Inventor:
Louis Legrand,
per
Henry Otto
Attorney (No Model.) 12 Sheets—Sheet 3.
L. LEGRAND.
EMBROIDERING MACHINE.
No. 466,248. Patented Dec. 29, 1891.
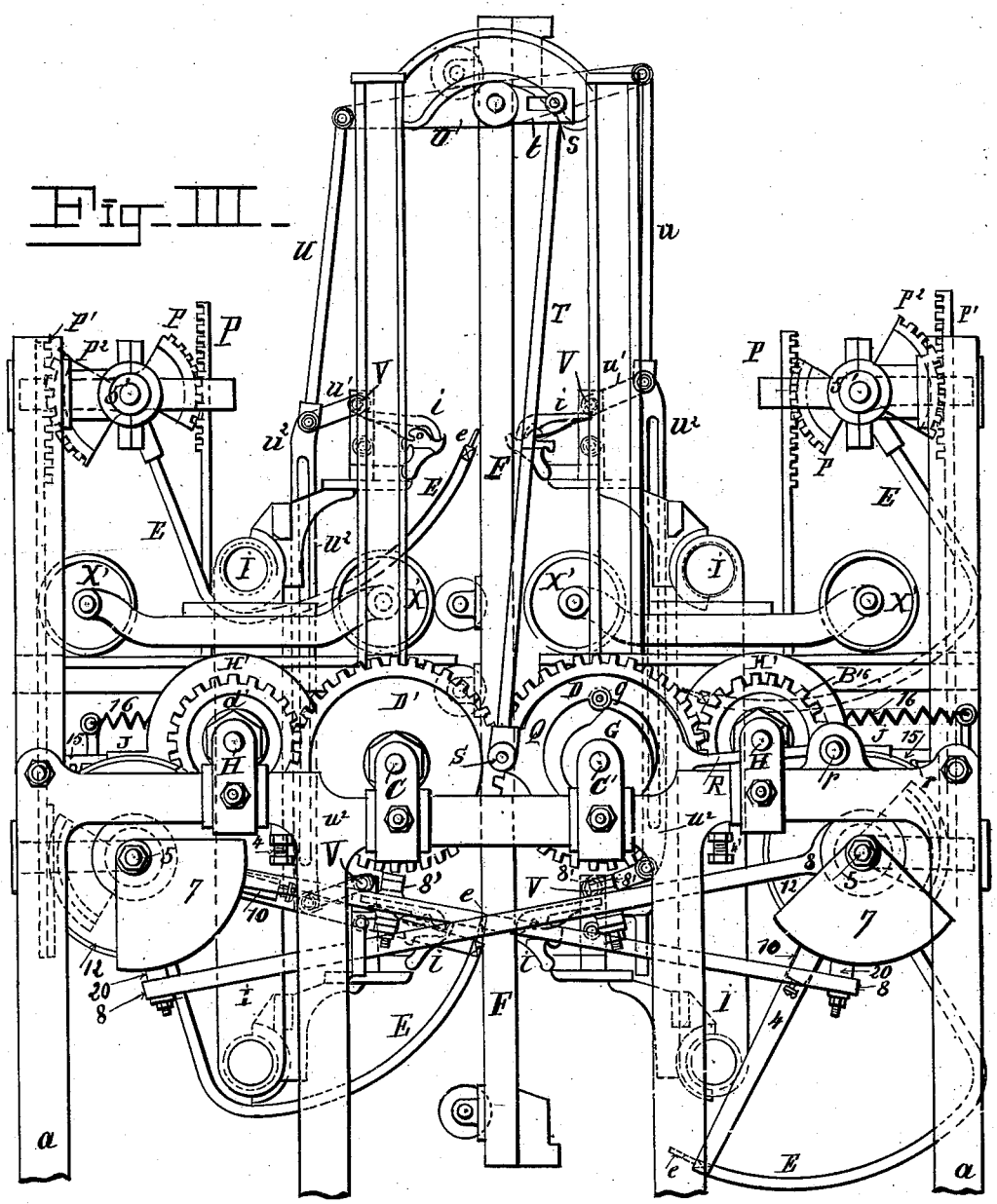
Fig. III.
Witnesses:
Henry G. Dietrich
B. W. Sommers
Inventor:
Louis Legrand,
per:
Henry Orth
Attorney.

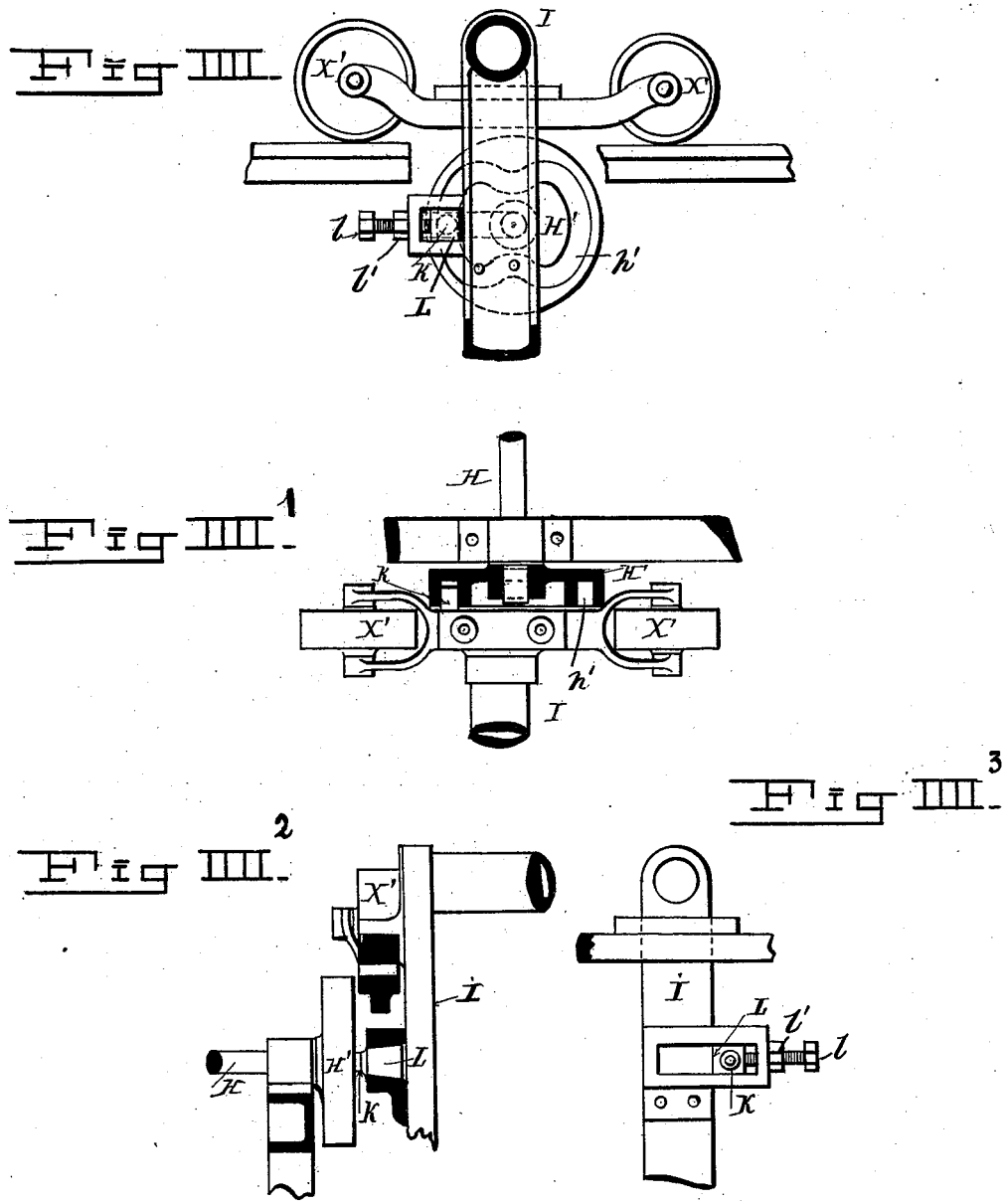

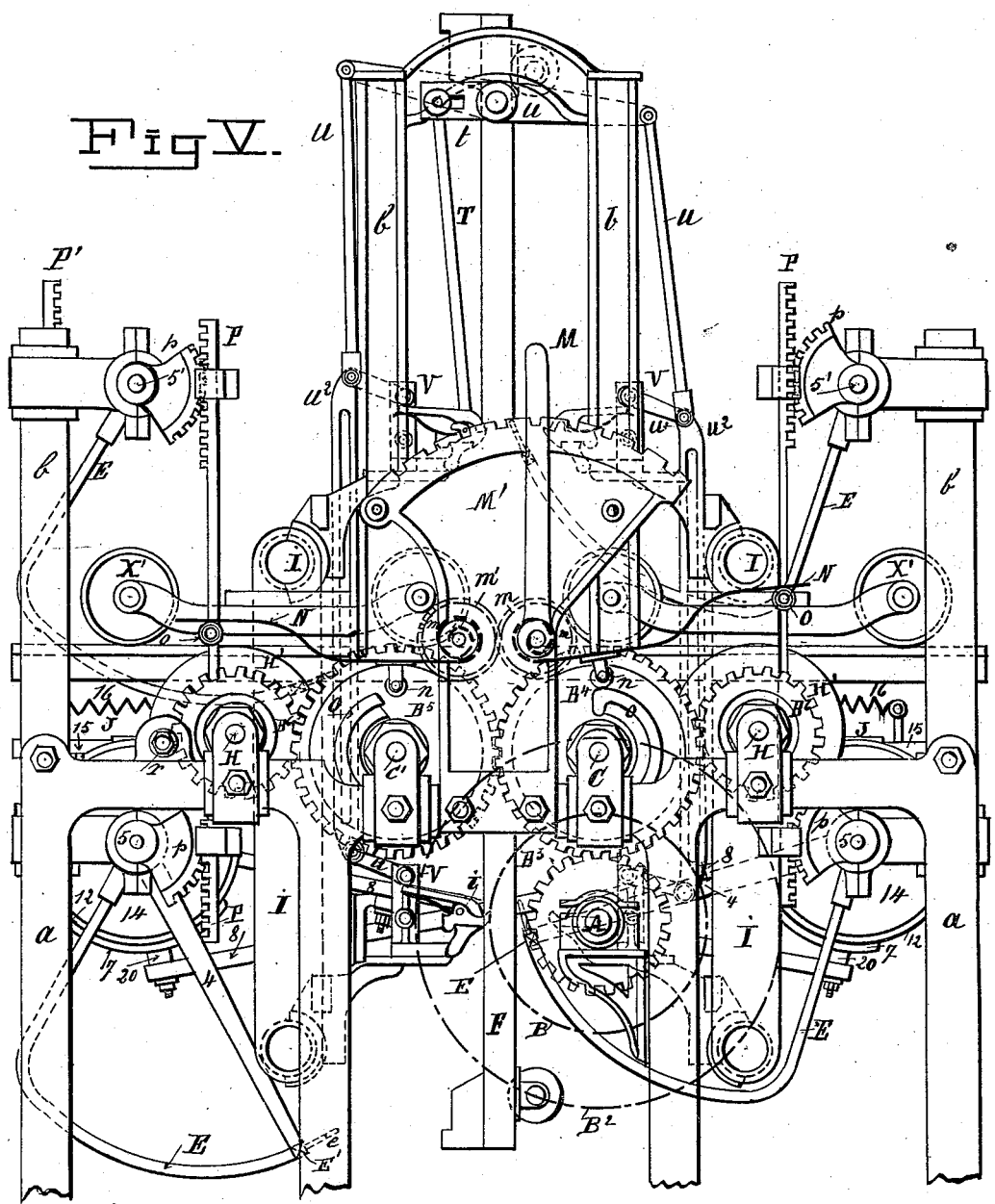

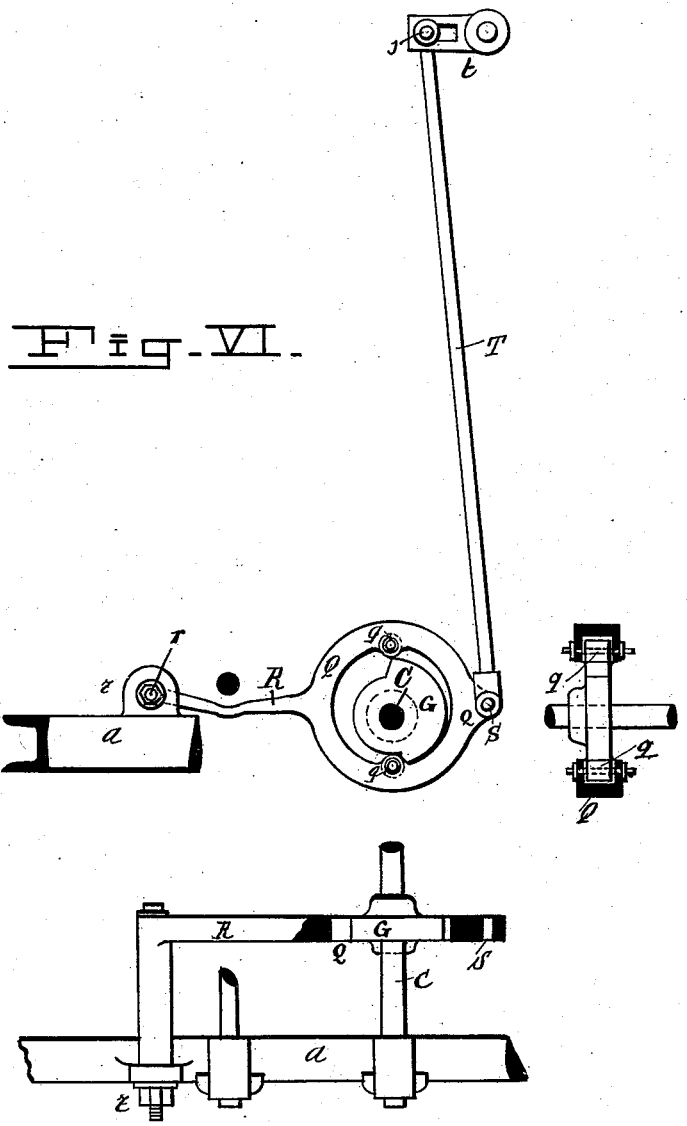

(No Model.)  12 Sheets—Sheet 7.
L. LEGRAND.
EMBROIDERING MACHINE.
No. 466,248. Patented Dec. 29, 1891.
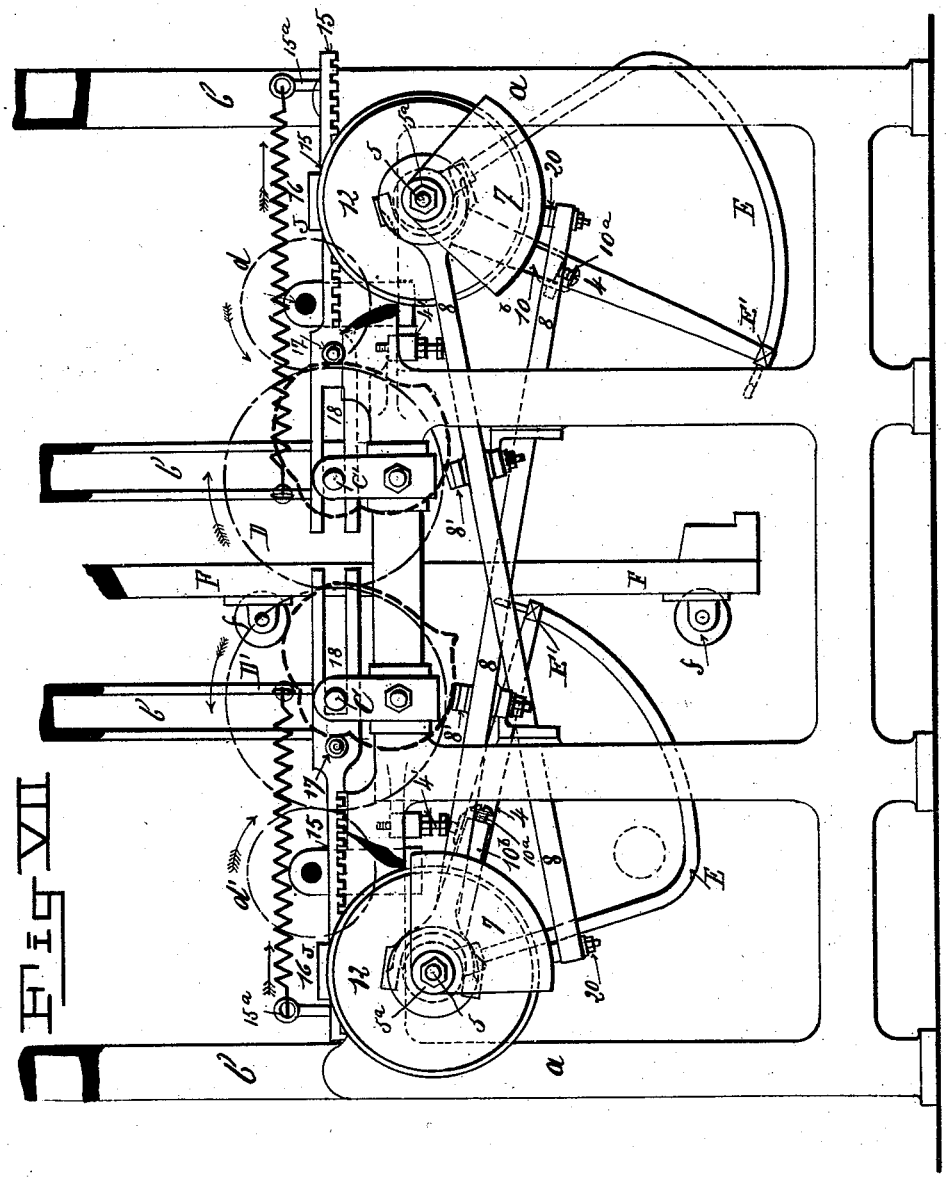
Witnesses:
Henry G. Dieterich
B. W. Sommers
Inventor:
Louis Legrand,
per
Henry Orth
Attorney.

(No Model.) 12 Sheets—Sheet 8.
L. LEGRAND.
EMBROIDERING MACHINE.
No. 466,248. Patented Dec. 29, 1891.
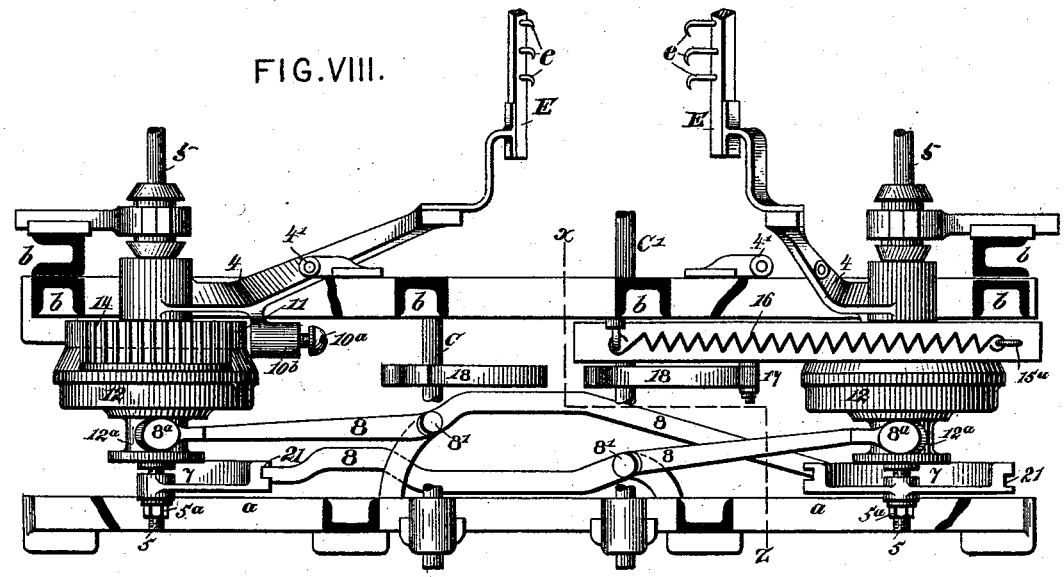
Witnesses:
H. G. Dieterich
P. W. Sommers
Inventor:
Louis Legrand,
Atty:

(No Model.)  12 Sheets—Sheet 9.
L. LEGRAND.
EMBROIDERING MACHINE.
No. 466,248.  Patented Dec. 29, 1891.
Fig X.
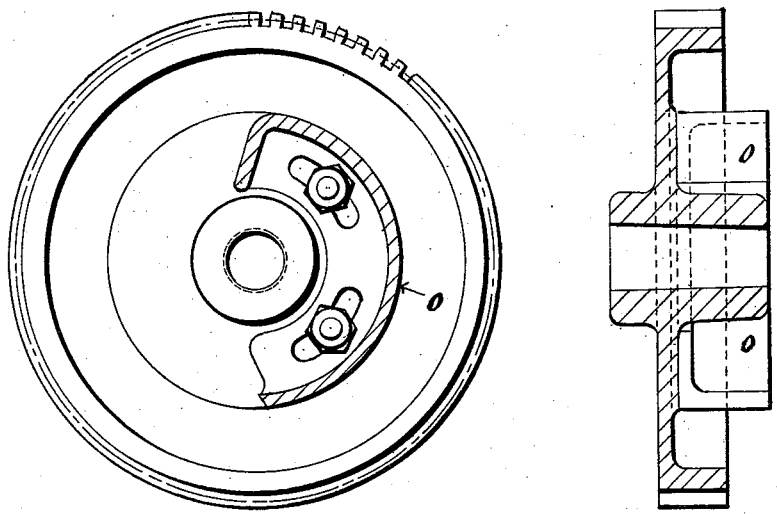
Witnesses:
Henry G. Dieterich
B. W. Sommers
Inventor:
Louis Legrand,
per
Attorney:

(No Model.) 12 Sheets—Sheet 10.
L. LEGRAND.
EMBROIDERING MACHINE.
No. 466,248. Patented Dec. 29, 1891.
Fig XI.
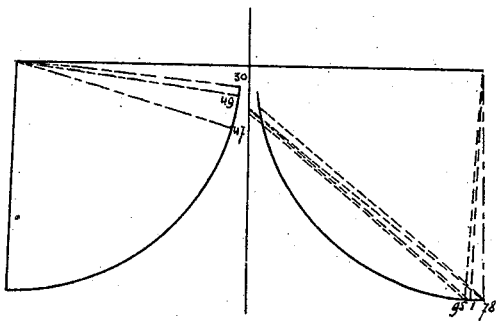
Fig XII.
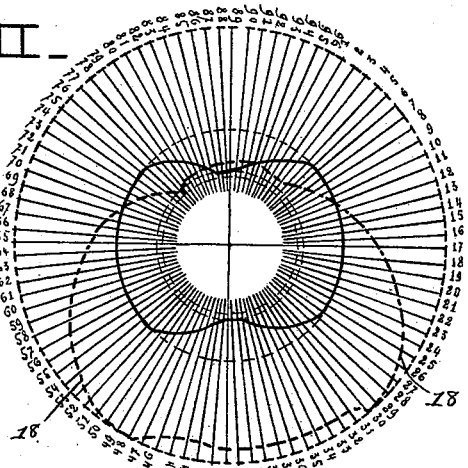

(No Model.) 12 Sheets—Sheet 11.
L. LEGRAND.
EMBROIDERING MACHINE.
No. 466,248. Patented Dec. 29, 1891.
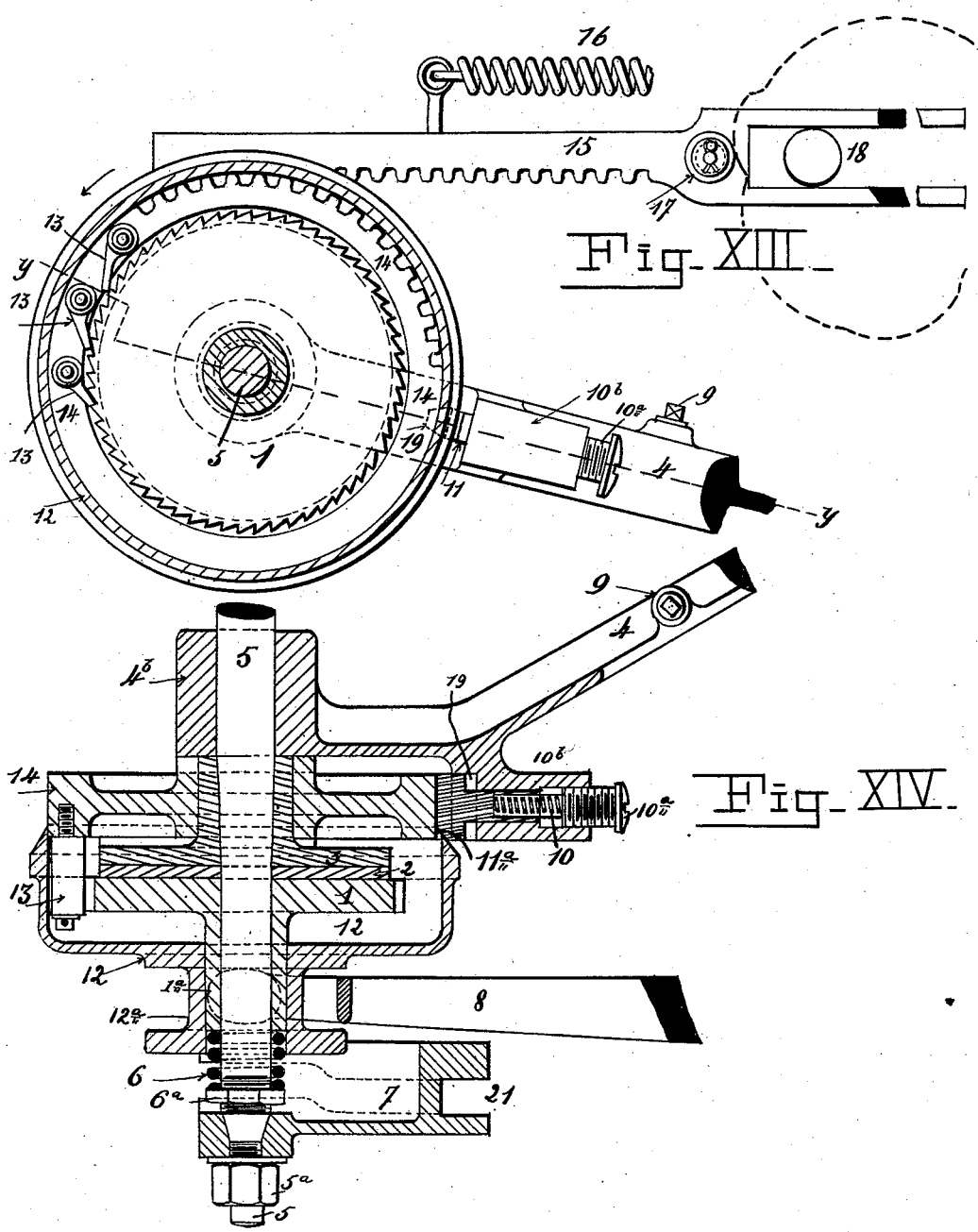

(No Model.) 12 Sheets—Sheet 12.
L. LEGRAND.
EMBROIDERING MACHINE.
No. 466,248. Patented Dec. 29, 1891.
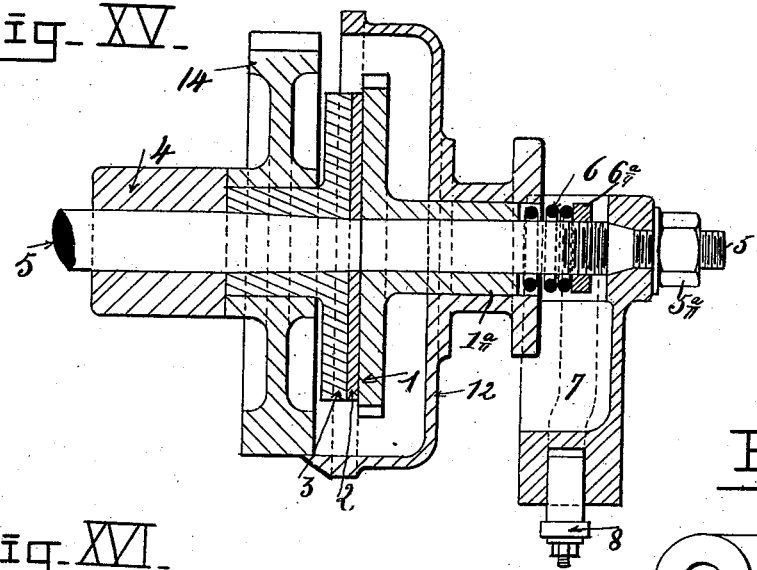
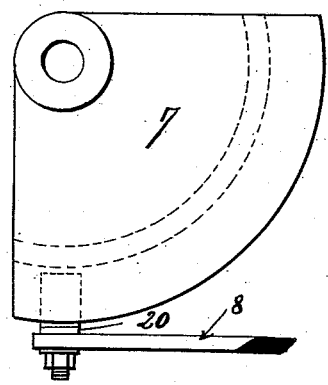
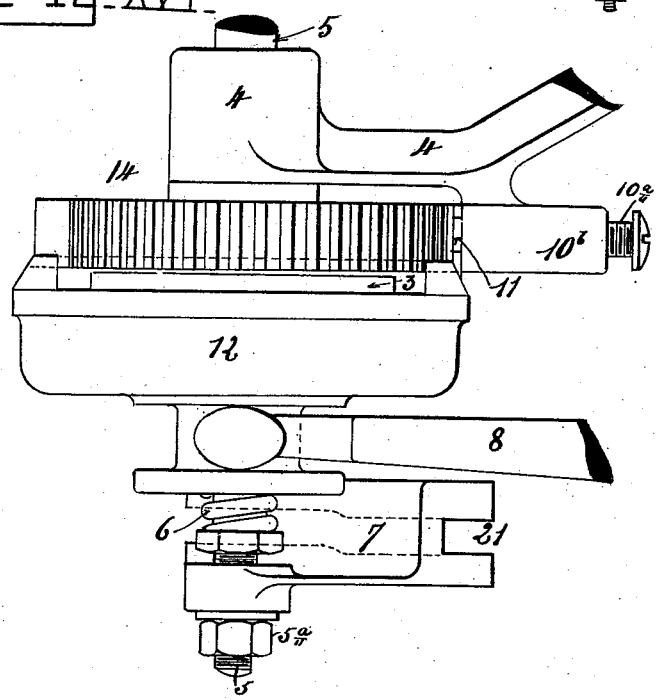
Witnesses:
Henry G. Dieterich
B. W. Sommers
Inventor:
Louis Legrand,
per
Attorney:

UNITED STATES PATENT OFFICE.

LOUIS LEGRAND, OF BRUSSELS, BELGIUM.

EMBROIDERING-MACHINE.

SPECIFICATION forming part of Letters Patent No. 466,248, dated December 29, 1891.

Application filed June 18, 1890. Serial No. 355,900. (No model.) Patented in Belgium February 28, 1890, No. 89,666; in Germany May 14, 1890, No. 55,226; in France May 20, 1890, No. 205,799; in Spain May 22, 1890, No. 10,831; in Switzerland May 22, 1890, No. 2,420; in England May 23, 1890, No. 7,504; in Austria-Hungary May 23, 1890, No. 23,594 and No. 45,086, and in Luxemburg May 23, 1890, No. 1,294.

*To all whom it may concern:*

Be it known that I, LOUIS LEGRAND, a subject of the King of Belgium, residing at Brussels, in Belgium, have invented certain new and useful Improvements in Embroidering-Machines, (for which patents were obtained in the following countries, to wit: in Belgium, dated February 28, 1890, No. 89,666; in England, dated May 23, 1890, No. 7,504; in Germany, dated May 14, 1890, No. 55,226; in France, dated May 20, 1890, No. 205,799; in Switzerland, dated May 22, 1890, No. 2,420; in Austria-Hungary, dated May 23, 1890, No. 23,594 and No. 45,086; in Luxemburg, dated May 23, 1890, No. 1,294, and in Spain, dated May 22, 1890, No. 10,831;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure I, Sheet 1, is a front elevation of an embroidering-machine embodying my invention and shown as broken through the center. Fig. II, Sheet 2, is a top plan view thereof. Fig. III, Sheet 3, is an elevation of the machine, taken from the right-hand end thereof. Figs. IIII, IIII', IIII², and IIII³, Sheet 4, are detail views of the cam that operates the reciprocating carriage for the needle-carriers. Fig. V, Sheet 5, is an elevation of the machine, taken from the left-hand end thereof, the fly-wheel and belt-pulleys being removed from shaft A and shown in dotted lines to bring into view the mechanism in rear of said parts. Fig. VI, Sheet 6, illustrates the cam that controls the opening and closing of the jaws or holders through the medium of a pendulum motion acting upon the eccentric-shafts in elevation, sectional top plan view, and vertical section, respectively. Fig. VII, Sheet 7, is a partial right-hand end elevation of the machine, illustrating the disks provided with the variable detent or locking devices for operating the thread-take-up racks or combs. Fig. VIII, Sheet 8, is a plan view of Fig. 7. Fig. IX, Sheet 8, is a section taken on line $x\,z$ of Fig. VIII. Fig. X, Sheet 9, is an enlarged sectional face view and a vertical section of the gear-wheel and cam-plate for supplementing the thread-tension by means of springs. Fig. XI, Sheet 10, is a diagram showing the movements of the threads. Fig. XII, Sheet 10, illustrates the position of the cam that operates the needle-carrier carriages relatively to the position of the cam that operates the rack-bars of the variable detent-plate, the former cam being shown in full lines and the last-named cam in dotted lines. Fig. XIII, Sheet 11, is a vertical sectional elevation of the parts that constitute the variable detent, Fig. XIV, Sheet 11, being a sectional view of Fig. XIII on or about on line $y\,y$ of Fig. XIII. Fig. XV, Sheet 12, is a sectional view taken at or about right angles to the section, Fig. XIV. Fig. XVI, Sheet 12, is a plan view of Fig. XIII; and Fig. XVII, Sheet 12, is a face view of the segment or quadrant that serves to throw the box 12 of the variable detent in and out of gear.

In embroidery-machines as heretofore constructed the following mechanisms have heretofore been under the control of and set in operation by the operator, namely: first, the pantograph, that controls the motions of the frame from which the fabric is supported; second, the gripping-jaws, the movements of which are controlled by eccentrics and the latter by levers set in motion by treadles and suitable connections; third, the crank that controls the mechanism for effecting the passage of the needles through the fabric and the passage of the needle-thread through said fabric by the continued motion of the needle-carriers, and, finally, the tension of the thread controlled by the same crank and manipulated by the operator after the needle-carriers have reached the end of their stroke.

The object of this invention is to avoid the labor and attention necessary to the manipulation of the various devices that control the movements of the mechanisms referred to by providing means whereby all of said mechanisms, with the exception of the pantograph, will be operated and controlled automatically, so that the operator will have nothing to do but to properly manipulate the said pantograph.

The invention consists in mechanism and combinations of mechanisms whereby the objects of my invention are attained, and will now be fully set forth, reference being had to the above-described sheets and figures of drawings, in which like letters or numbers indicate like parts wherever such may occur.

I have deemed it unnecessary to illustrate the pantograph or to describe the same in detail, for the reason that it does not form a part of this invention, and for the further reason that its form or construction or its location in relation to and operation with other parts of the machine is the same as in other machines and therefore well known.

The principal operative parts of the machine receive motion from a driving-gear, as follows:

Referring more particularly to Figs. I, II, III, and V, a short shaft A carries a fly-wheel $B^2$, a fast and loose pulley B B', respectively, and a pinion $B^3$, that is in gear with a wheel $B^4$ on a through-shaft C, that carries at its opposite end a like gear-wheel D' in gear with two other wheels of the same diameter and marked, respectively, $B^5$ and D, also mounted on a through-shaft C'. The wheels $B^4$ and $B^5$ at one end of the machine are in gear with pinions $B^6$ of like diameter, and the wheels D' and D at the opposite end are in gear with like pinions H'.

I will now describe the mechanism for automatically operating the gripping-jaws, which constitutes one of the features of my invention.

The through-shaft C' also carries at its right-hand end, in front of the gear-wheel D, a cam G, Figs. I, II, V, and VI, that revolves in a collar or strap Q, provided with two internal rollers q. The strap has an arm R, by means of which it is pivoted to the main frame a of the machine, as shown at r. The strap Q is connected to a radial or crank-arm t on the shaft of a lever or walking-beam U through the medium of a connecting-rod T and the pins S s, whereby a uniform rocking motion is imparted to the beam U. This motion is transmitted to the upper and lower gripping-jaws of the two sets of such by means of the connecting-rods u and $u^2$, that are connected to the radial arms or cranks u' on the crank-shafts V, that operate the holders or gripping-jaws i. (See Figs. I, II, III, and V.) The upper crank-shafts V on each side of the machine are rocked by the rods u, while the corresponding lower shafts V are rocked by the rods $u^2$, pivoted to rod u, as shown in Figs. I and III. The movements of the walking-beam U are so timed as that the gripping-jaws of one carriage will close when those of the corresponding carriage open, as usual. The shafts H of the pinions $B^6$, that are in gear with the wheels $B^4$ and $B^5$, respectively, at one end of the machine, and the shafts H of the corresponding pinions d and d', that are in gear with like wheels D and D' at the opposite end of said machine, (see Figs. III and V,) carry each a cam H'. The foremost cams H', at opposite ends of the frame, impart motion to the front carriage I, and the rearmost cams to the back or rear carriage. These cams H' are all alike, and their construction is plainly shown in Figs. IIII, IIII', $IIII^2$, and $IIII^3$, Sheet 4.

As shown in Fig. III the carriages I are supported by rollers X' in the ordinary manner; but in my improved machine the amplitude of motion of said carriages is reduced from about one meter, as is the case in the embroidering-machines as heretofore constructed, to about five centimeters, the advantages not only in the increase of efficiency of the parts and accuracy of motion, but also in the diminution of wear will be readily comprehended by those familiar with this class of machines. This reduction of the amplitude of motion of the carriages I is due to the fact that only a motion sufficient to cause the needles to pass through the fabric is necessary, for the reason that the tension of the threads is regulated by a special tension or take-up mechanism, instead of being effected by a continuation of the movement of the carriages themselves.

The cams H' consist of disks having in their faces a cam-groove h', Fig. IIII, of proper configuration to impart to the carriages I the required traversing motion through the medium of a roller K, mounted on a stud L that is adjustable in a slotted bracket secured to the vertical arms of the frames of the carriages I, the adjustment being effected by a bolt l and a jam-nut l', Figs. IIII, $IIII^2$, and $IIII^3$.

At the right-hand end of the machine the shafts C and C', that carry the gear-wheels D and D' corresponding to the gear-wheels $B^5$ and $B^4$ at the left-hand end of the machine, also carry a cam 18 of irregular form, as shown in dotted lines in Fig. VII, Sheet 7, and in Fig. XII, Sheet 10, said cams imparting motion to the horizontal rack-bars 15 through the medium of a roller 17 on a stud or pin secured to said rack-bars. (See Fig. VII.) The rack-bars are forked at their inner ends, the arms of the fork straddling their respective cam-shaft C' C, while the opposite end of said rack-bars is guided in a guide-sleeve j. Near the outer end of each rack-bar 15 is secured an eyebolt $15^a$, to which is attached one end of a spring 16, whose other end is secured to the uprights b of the upper frame-section, the rack-bars being moved by the cams 18 against the stress of said springs which return said rack-bars into their normal positions after having been moved out of it by the cams 18. These rack-bars 15 impart motion to two sets of devices of the same construction. It will therefore suffice to describe the construction and function of one set of devices—namely, those in front of the machine—for imparting motion to the forward set of take-up racks or combs and constitute the devices for automatically regulating the tension of the threads, which form another important part of this invention and which I will now describe, reference being had to Figs. I, II, III, and V, and more especially to Figs. VII, VIII, IX, and XIII to XVI. The rack-bar 15 co-operates with a mutilated gear or a disk, having one-third only of its periphery provided with teeth, and which I will hereinafter denominate as the "variable detent-disk." This disk 14 is loose on its shaft 5, which latter also supports the arms 4, that carry the thread-take-up racks or combs E of one of the lower sets of such. The disk 14 has formed in its periphery a notch or recess 19, with which is adapted to engage a bolt 11, actuated by a spring 10, the tension of which can be regulated by an adjusting-bolt $10^a$, said bolt 11 being arranged in a sleeve-bearing $10^b$, projecting from the arm 4 of the take-up rack and serves to lock the variable detent-disk to its shaft when said bolt 11 engages the recess 19. The locking or clutch bolt 11 is, however, beveled on one side, as shown at $11^a$, Fig. XIV, and on the same shaft 5 is mounted an annular cap or box 12, whose inner edge is also beveled, said beveled edge being adapted to engage the beveled face $11^a$ of the bolt 11 and move the same against the stress of its spring 10 out of engagement with the variable detent-disk 14 (see Fig. XIV, Sheet 11) for purposes hereinafter more fully described. The arm 4, that supports the take-up comb E, has a stop 9, adapted to contact during the upward motion of the arm with an adjusting-screw 4', Figs. VII, VIII, and IX, Sheets 7 and 8. The variable detent-disk 14 also carries three pawls 13, adapted to engage a ratchet-wheel 1 and revolve the same when said disk is revolved in the direction of the arrow, Fig. XIII, Sheet 11, and to freely ride over said teeth when the disk 14 revolves in a reverse direction. As shown, the three pawls are of different lengths or pivoted at different points on the disk 14 to the extent of about one-third of the length of one of the ratchet-teeth, so that one or the other of said teeth will always be in full engagement with one of the ratchet-teeth, thereby avoiding all idle motion of disk 14, which would be the case if a single pawl were employed, the extent of such idle motion depending upon the position thereof relatively to the ratchet-teeth and may be equal to the full length of a ratchet-tooth. The ratchet-wheel 1 is also loose on its support and is revolved by friction. To this end I provide a friction-disk 3, rigidly secured to the shaft S, and a spring 6, one end of which bears against an adjusting-nut $6^a$ and the other against the outer end of the hub $1^a$ of the ratchet-wheel 1, said spring 6 pressing the ratchet-wheel constantly against the disk 14.

To increase the frictional contact between the disk 14 and ratchet 1, and also to admit of a reduction in the weight of the disk 14, I construct the same in the form of a wheel and provide a friction-disk 3, loosely mounted on shaft 5, and I secure to the disk 14 on the hub of said friction-disk 3 and interpose between the disk and the ratchet-wheel 1 a washer or disk 2, of leather or rubber, as shown in Fig. XIV.

In order to make the described mechanism more compact and also to provide means for taking up the wear of said parts and of the shaft 5, I provide the ratchet-wheel 1 with a hub $1^a$, as above set forth, and loosely mount thereon the box or cap 12. To take up wear the shaft 5 is made to taper from the bearing $4^b$ of arm 4 outwardly, its outer end being screw-threaded and carrying the adjusting or lock nut $5^a$, as plainly shown in Figs. XIV, XV, and XVI, the said nut $5^a$ bearing against the segment or quadrant 7 on the outer end of shaft 5. The box or cap 12 has free endwise motion on the hub $1^a$ of the ratchet-wheel 1 and is reciprocated thereon. This reciprocating motion is imparted to the box or cap 12 by means of the levers 8, Figs. VII and VIII, and segments or quadrants 7, as follows: As hereinabove stated, the shafts 5 5' of the oppositely-arranged tension devices carry at their outer ends a quadrant 7, that is provided with a peripheral cam-groove 21, in which travels a roller 20 at one end of the levers 8, which are fulcrumed at 8' on the frame of the machine. At the opposite end each lever carries a curvilinear block $8^a$, that lies in a groove $12^a$, formed in the hub of the box or cap 12. As shown in Fig. VIII, the two levers 8 cross each other, and are so arranged relatively to the boxes 12 as that the lever in engagement with the cam-groove in the quadrant 7 on the right engages by its opposite end the groove $12^a$ in the hub of box 12, and vice versa, so that the boxes have endwise motion on the hub $1^a$ of their respective ratchets in opposite directions, and so that as one box is moving toward the disk 14 the other is moving away from it.

The upper tension devices are operated by the mechanism just described through the medium of toothed sectors $p$ on the shafts 5 and 5' of the lower and upper comb-carriers, respectively, and rack-bars P, as shown in Figs. I, III, and V. With this mechanism I combine appliances adapted to be operated by hand for the purpose of amplifying the stroke of the take-up combs whenever this becomes necessary from any cause. To this end I provide the following devices, referring to Figs. I, II, and V: $m$ and $m'$ are two pinions in gear with each other, the shaft of one of said pinions carrying a hand-lever M, whose spring-tooth is in engagement with the teeth of a sector M'. The shaft of each of the pinions carries a leaf-spring N, that has a roller $n$ in the path of a segmental rib O, on the outer face of the gear-wheels $B^4 B^5$. The outer or free end of the springs N bear upon a roller $o$, secured to a vertical rack-bar P, in gear with a toothed sector $p$ on the shafts 5 and 5' of the lower and upper take-up devices E, respectively. It is obvious that when the lever M is moved to the right over the sector M' both springs N will be brought under tension, thereby depressing the vertical rack-bars and imparting to the toothed sectors $p$ and their shafts 5' and 5 a partial revolution, thereby withdrawing the tension comb-carriers E—that is to say, the upper tension comb-carriers E, as well as the lower tension comb-carriers, will simultaneously move outwardly whenever the springs are brought under tension.

In order that my invention may be better understood, I will now describe the operation of the machine, and said operation will be best understood by describing the formation of a stitch. As will be readily understood there are two tension racks or combs E' for each row of needles, one of said racks being arranged in front of the other in rear of the fabric to be embroidered. Each rack or comb has take-up hooks $e$, which I preferably make of wood, the number of said hooks corresponding with the number of needles employed, and said hooks and the rail to which they are secured constitute the tension or take-up racks or combs E', supported by suitable carrier-arms secured to a shaft. The shafts 5 and 5' of two superposed combs are connected by means of the sectors $p$, through the vertical rack-bars P, the operation of the front set of combs being the same as that of rear set of combs. I will limit the description of such operation to one comb. It will be supposed that the carriages I are substantially open and that the needles have just passed behind the fabric. The front comb, which held the threads taut, will now have moved inwardly or upwardly to slacken said threads, without, however, releasing the same, which has the important advantage of preventing wear and breakage of the threads, said front comb continuing its upward motion in proportion to the inverse or downward motion of the rear comb. This movement of the front comb continues until said comb reaches a point somewhat below the needles, at which point the threads are automatically unshipped or released from the comb-hooks $e$, as said comb contacts with the adjustable abutment-screw 4', that limits its upward movement. From this moment the two movements of the comb are the same for every stitch, whatever may be the length of the threads, though of course it will have to recede from under the needles first, in order to allow the carriage I to pass in its movement toward and for effecting the closure of the needles, after which the comb again moves upwardly to take hold of the threads presented thereto. The latter movement is effected with sufficient rapidity or abruptness to enable the comb to properly seize the threads, which takes place a little before the carriage I has fully receded, whereby the threads are drawn more or less taut by the receding motion of said carriage and thus automatically take a proper position under the take-up or tension comb, and for a like reason the back threads at this moment are also brought under slight tension. As soon as the threads are hooked on the comb-hooks $e$, said comb commences to descend and continues to descend until the threads are under sufficient tension, but said movement is arrested as soon as the comb is entirely beyond the material operated upon. After this the further tension of the thread, if necessary, is effected by means of the lever M and devices operated thereby, to cause the combs to recede still farther. At this moment another variable interval occurs. The comb remains stationary for a longer or a shorter period until the carriages move forward again or begin to close, after which the regular movements of the comb in the formation of a stitch is resumed. As the carriage approaches the fabric, the thread rises and continues its upward motion during the receding motion of the carriage or during the greater part of said motion. At the proper moment the carriage stops, so as to bring those threads to be taken up by the rear comb E' under proper tension, while the front comb continues its upward movement, as above described. It will be seen that two movements of the comb-shafts are necessary for each stitch, between which movements there must be an interval during which the comb-shafts remain stationary, the period of rest being variable, which movements are effected through the medium of the cam 18, that actuate the racks 15, which control the movements of the variable detent disk or wheel 14. By an inspection of Fig. VII it will be seen that the cams 18 and the springs 16 impart a continuous reciprocating motion to the horizontal rack-bars 15; that said rack-bars are adapted to gear with the toothed portion of the variable detent-disk 14, and, as above stated, the said disk is loosely mounted on its support and is periodically locked thereto and to its shaft through the medium of the locking-bolt 11. When so locked, the disk 14 will revolve with the shaft 5, carrying along with it the carrier-arms 4 of the comb E', to increase the tension of the threads or to draw them out to their full extent. So long as the threads have their full length the coupling between the arm 4 and disk 14 will remain unaffected, but as soon as the threads shorten it is necessary that the stroke of the arms 4 be correspondingly shortened. This is effected by means of the box or cap 12, which is wedged under the bolt 11, and pushes the same against the stress of its spring 10 out of the recess 19 of the disk. The endwise movement of the disk is imparted thereto, as hereinbefore stated, by one of the levers 8, one end $8^a$ of which works in the groove $12^a$ of the hub of the box 12, the arrangement being such that the box in front of the fabric will be actuated by the lever 8, operated by quadrant 7 of the shaft that carries the box in rear of said fabric. When the bolt 11 is withdrawn from the recess 19 in disk 14, the latter will continue to oscillate without entraining the arm 4 and shaft 5, which remain stationary until the comb E' is to be moved again. To this end I employ the friction-disk 3, loose on shaft 5, the ratchet-wheel 1, locked to disk 14 by the three pawls 13, and held against the face of the disk 3 on the intermediate friction-disk 2 by the spring 6, said ratchet being locked to disk 14 by one or the other of the pawls 13, so that said ratchet will revolve with disk 14 only when said disk revolves in the direction of the arrow Fig. XIII, said ratchet, and consequently its shaft 5, remaining stationary when the disk is revolved in a reverse direction in its oscillatory movements imparted thereto by the horizontal rack-bars 16. Should the shaft 5 encounter a resistance to its motion too great to be overcome by the frictional contact between the disks 2 3 and the ratchet 1 its further movement will be arrested, the ratchet remaining stationary. This will be readily understood by an examination of Figs. XIV, XV, and XVI, Sheets 11 and 12. The operation of these devices is so timed that when the arm 4 that carries the tension-comb E' is in its lowermost position the bolt 11 will be disengaged from the recess 19 in disk 14, and the rack 15 will then be moving inwardly, the shaft 5 being revolved by the ratchet and friction devices in the direction of arrow Fig. XIII until the stop 9 on arm 4 comes in contact with the abutment-screw 4'. The resistance to the further upward motion of the arm will now result in the stoppage of the ratchet 1, disk 14, and friction-disk 3, the intermediate friction-disk 2 revolving idly between said disk 3 and ratchet 1. At this moment, however, the locking-bolt 11 engages the recess 19 in disk 14, thus again locking the tension-comb E' to said disk 14, which latter will now impart to the arms 4 and the comb a slight downward movement to bring said comb clear of the needles, and immediately thereafter a farther upward motion to enable the hooks e of the comb to seize the threads, and this accomplished, the comb moves downward to impart the necessary tension to the threads. At this moment the opposite combs are about to reach their greatest elevation when the lever 8 will actuate the box 12 to disengage the bolt 11 from the disk 14 and disconnect the arm 4 of the comb just moved down. During the downward motion of the combs, the rack-bars 15 are moved inwardly under the stress of their springs, the pawls 13 riding over the teeth of the ratchet 1, but as soon as said rack-bars 15 begin their positive movement, one or the other of the pawls being in perpetual and full engagement with the ratchet-teeth, said ratchets will be revolved by disk 14, thereby causing the comb-arm 4 again to move upwardly.

From what has been said above the operation of those parts of the machine that comprehend my invention will be readily understood, and I will state in conclusion that these improvements admit of the combination and simultaneous operation of two such machines by a single attendant by simply combining or connecting the pantographs thereof.

Having described my invention, what I claim is—

1. The combination, with the gripping-jaws of an embroidering-machine, of mechanism for automatically opening and closing said jaws, comprising an oscillating lever adapted to impart a corresponding movement to the shaft of the movable jaws, said lever being set in motion by a revoluble element of the machine, and devices for converting the rotary motion of said element into a rocking motion comprising a strap or ring, a revoluble cam adapted to impart an oscillating motion to the strap, and a transmitting-rod connected to the strap and oscillating lever, substantially as set forth.

2. The combination, with the oppositely-arranged gripping-jaws of an embroidering-machine and the crank-shafts upon which the movable jaws are secured, of mechanism for automatically opening and closing said jaws, comprising a walking-beam, connecting-rods connected with said beam and the cranks on the shafts of the movable jaws, a revoluble cam adapted to receive motion from a continuously-revolving element of the machine, a strap Q, provided interiorly with rollers q, in which said cam operates, a pivotal connection between the strap and a fixed support, and a connection between said strap and the walking-beam, substantially as set forth.

3. The combination, with the oppositely-arranged upper and lower sets of gripping-jaws of an embroidery-machine and the crank-shafts of the movable jaws of said sets, of mechanism for automatically opening and closing said jaws, comprising a walking-beam, connecting-rods $u$, connecting the arms of the beam to the cranks of the oppositely-arranged movable jaw-shafts, connecting-rods $u^2$, connecting the cranks of the shafts of the lower sets of movable shafts with the connecting-rods $u$, a cam adapted to receive motion from a continuously-revolving element of the machine, a strap Q, provided with rollers $q$ on its interior periphery in which strap said cam revolves, a pivotal connection between the strap and a fixed support, and a connection between said strap and the walking-beam, adapted to transmit the oscillatory movement of the strap to the walking-beam, as set forth.

4. The combination, with the needle-carriers and needles of an embroidering-machine, the take-up devices, and mechanism for imparting a determined variable reciprocating motion thereto, comprising a rack-and-pinion gear and a cam, as 18, of means for amplifying the movement of said take-up devices in one direction, consisting of a spring exerting its power on the rack, and means for varying the tension of the spring, for the purpose set forth.

5. The combination, with the needles of an embroidering-machine, the traversing carriages, and the needle openers and closers connected with said carriages, of a take-up device for taking up the slack in the needle-threads, comprising a comb-plate provided with a hook for each needle, and actuating mechanism for operating said comb-plate so as to cause it to move into proximity of the needles, then recede slightly therefrom to clear the passage for the carriages, again approach said needles after said carriages have moved out of the way, and finally recede therefrom to the extent of their stroke, for the purpose set forth.

6. The combination, with the needles of an embroidering-machine, the traversing carriages, and the needle openers and closers connected with said carriages, of a take-up device for taking up the slack in the needle-threads, comprising a comb-plate provided with a hook for each needle, actuating mechanism for operating said comb-plate so as to cause it to move into proximity of the needle, then recede slightly therefrom to clear the passage for the carriages, again approach said needles after said carriages have moved out of the way, and finally recede therefrom, and a hand-operated tension device connected with the take-up devices and operating to amplify their movement in a direction away from the needles, for the purpose set forth.

7. The combination, with the needles of an embroidering-machine and a take-up device for the needle-threads adapted to move toward and from the needles, said motion being imparted to said device from a moving element of the machine, of means for increasing the tension of the needle-threads, comprising a rack-bar, a sector on the rock-shaft of the comb-plate carrier in gear with said rack-bar, a hand-lever, and a spring, the tension of which is controlled by the hand-lever and is adapted to actuate the rack-bar, substantially as and for the purposes specified.

8. The combination, with the needles of an embroidering-machine and a take-up device for the needle-threads, comprising a comb-plate provided with a hook for each needle, a carrier for said plate, and a shaft upon which said carrier is loosely mounted of the partially-toothed disk 14, the locking bolt or dog 11, connected with the comb-plate carrier and adapted to engage the disk 14, the friction-disks 2 and 3, the ratchet-wheel 1 and a locking device for locking the ratchet to the disk 14, and a reciprocating rack-bar in engagement with the teeth of said disk 14, substantially as and for the purposes specified.

9. The combination, with the needles of an embroidering-machine and a take-up device for the needle-threads, comprising a comb-plate provided with a hook for each needle, a carrier for said plate, and a shaft upon which said carrier is loosely mounted, of the partially-toothed disk 14, the locking bolt or dog 11, connected with the comb-plate carrier and adapted to engage the disk 14, the friction-disks 2 and 3, the ratchet-wheel 1 and a locking device for locking the ratchet to the disk 14, a cylindrical box having beveled edge adapted to periodically engage the locking-bolt and disengage the same from the disk 14, and a rack-bar in engagement with the teeth of the disk and adapted to impart to the same an oscillating motion, substantially as and for the purposes specified.

10. The combination, with the needles and take-up devices of an embroidering-machine, of the shaft 5, the disk 14, the locking-bolt 11, having one of its faces inclined or beveled, and the box 12, having its edges wedge-shaped in cross-section and provided with a groove in its hub, said wedge-shaped edge of the box being adapted to engage the inclined face of the bolt of the lever 8, one end of which engages the groove in the hub, said lever being adapted to oscillate on its fulcrum, substantially as and for the purposes specified.

11. The combination, with the needles and take-up devices of an embroidering-machine, of the shafts 5, the boxes 12 thereon, the disks 14, the locking-bolt 11, having one of its faces inclined or beveled, the box 12, having its edge wedge-shaped in cross-section and provided with a groove in its hub, said wedge-shaped edge of the box being adapted to engage the inclined face of the bolt, and the quadrant 7 on the shafts of the boxes provided with a peripheral cam-groove 21, and two levers 8, the ends of which are in engagement with the cam-groove of the quadrant 7 on one shaft and with the groove in the hub of the box 12 on the oppositely-arranged shaft, respectively, whereby the endwise movement of one of the boxes on its shaft on one side of the fabric is controlled by the movements of the shaft for the box on the opposite side of the fabric, substantially as and for the purposes specified.

12. The combination, with the disks 14 and devices operated thereby, of the cams 18 and their shafts C C', the forked rack-bars 15, straddling said shafts and engaging the toothed portion of said disks 14, and the springs 16, substantially as and for the purposes specified.

13. The combination, with the shafts 5 and 5' on opposite sides of an embroidering-machine, a sector $p$ on each of said shafts, and a rack-bar in gear with the sectors of a pair of shafts, of the intergearing pinions $m$ and $m'$, a spring N, secured to the shafts of each pinion, the free ends of said springs extending in opposite directions and engaging the said rack-bars, and a hand-lever on one of the pinion-shafts for imparting motion to the pinions to wind or unwind the fixed end of the springs for the purpose of increasing or reducing the tension exerted by the free ends thereof, substantially as and for the purposes specified.

14. The combination, with the shafts 5 and 5' on opposite sides of an embroidering-machine, a sector $p$ on each of said shafts, and a rack-bar in gear with the sectors on said shafts, of the intergearing pinions $m$ and $m'$, a spring N, secured to the shaft of each pinion, the free ends of said springs extending in opposite directions and engaging the said rack-bars, said springs having rollers on their under sides, the gear-wheels $B^4$ $B^5$, provided each with a segmental rib O, adapted to engage the rollers on the springs, and a hand-lever on one of the pinion-shafts, substantially as and for the purposes specified.

In testimony whereof I affix my signature in presence of two witnesses.

LOUIS LEGRAND.

Witnesses:
  HENRY RACLOT,
  EDOUARD LABASQUE.